United States Patent
Nakatsuka et al.

(10) Patent No.: US 6,632,366 B1
(45) Date of Patent: Oct. 14, 2003

(54) CELLULOSE COMPOUND HOLLOW FIBER MEMBRANE

(75) Inventors: Shuji Nakatsuka, Hyogo (JP); Sachiko Matsuoka, Hyogo (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 09/719,202

(22) PCT Filed: May 12, 2000

(86) PCT No.: PCT/JP00/03056

§ 371 (c)(1),
(2), (4) Date: Dec. 7, 2000

(87) PCT Pub. No.: WO00/72950

PCT Pub. Date: Dec. 7, 2000

(30) Foreign Application Priority Data

May 31, 1999 (JP) .............................. 11-151782

(51) Int. Cl.[7] ........................... B01D 29/00; B01D 71/10
(52) U.S. Cl. ............ 210/655; 210/500.29; 210/500.23; 210/500.3; 210/500.31; 210/500.32; 264/41
(58) Field of Search ...................... 210/500.59, 500.27, 210/500.23, 500.3, 500.31, 500.32, 655; 264/41

(56) References Cited

U.S. PATENT DOCUMENTS

| 4,808,312 A | * | 2/1989 | Suzuki et al. |
| 4,980,063 A | * | 12/1990 | Mahoney et al. |
| 5,063,009 A | * | 11/1991 | Mizutani et al. |
| 5,611,930 A | * | 3/1997 | Nguyen et al. |
| 5,849,189 A | * | 12/1998 | Emi et al. |
| 6,013,182 A | * | 1/2000 | Emi et al. |

FOREIGN PATENT DOCUMENTS

| JP | 52-85525 | 7/1977 |
| JP | 53-127374 | 11/1978 |
| JP | 53-131983 | 11/1978 |
| JP | 54-88881 | 7/1979 |
| JP | 54-126294 | 10/1979 |
| JP | 55-24506 | 2/1980 |
| JP | 57-133211 | 8/1982 |
| JP | 60-5202 | 1/1985 |
| JP | 60-29763 | 2/1985 |
| JP | 60-43442 | 9/1985 |
| JP | 61-185305 | 8/1986 |
| JP | 61-282415 | 12/1986 |
| JP | 62-290468 | 12/1987 |
| JP | 63-17922 | 1/1988 |
| JP | 2-12611 | 1/1990 |
| JP | 2-211228 | 8/1990 |
| JP | 5-228208 | 9/1993 |
| JP | 6-31144 | 2/1994 |
| JP | 6-277473 | 10/1994 |
| JP | 6-343842 | 12/1994 |
| JP | 8-108053 | 4/1996 |

OTHER PUBLICATIONS

Basic principles of Membrane Technology, Kluwer Academic Publishers, 1991, pp. 112–131.*

* cited by examiner

*Primary Examiner*—Ana Fortuna
(74) *Attorney, Agent, or Firm*—Flynn, Thiel, Boutell & Tanis, P.C.

(57) ABSTRACT

The present invention relates to a cellulose compound hollow fiber membrane having high mechanical strength and is hardly degraded by microorganisms, wherein a cellulose compound is comprised as a membrane material, the thickness of the membrane is 50 to 500 $\mu$m, a dense membrane surface having an average pore diameter of 0.001 to 0.05 $\mu$m exists on the internal and/or external surface thereof, the inside of the membrane is composed of a three-dimensional network-like porous structure having voids with an average pore diameter of 0.05 to 2 $\mu$m, and 70% by weight or more of the membrane material is cellulose acetate propionate or cellulose acetate butyrate.

6 Claims, 2 Drawing Sheets

CELLULOSE COMPOUND HOLLOW FIBER MEMBRANE

FIELD OF THE INVENTION

The present invention relates to a cellulose compound hollow fiber membrane suitable in particular for water treatment in natural water areas such as rivers, lakes and marshes.

PRIOR ART

Cellulose acetate membranes have been used as asymmetrical reverse osmosis membranes for converting sea water into fresh-water and blood dialysis membranes, and cellulose acetate membranes of hollow fiber membrane directed to these uses have been developed (e.g., JP-A 54-88881, JP-A 61-185305, JP-A 60-29763, JP-A 63-17922, JP-A 5-228208 and JP-A 6-343842). Further, cellulose compound or cellulose ester membranes other than the cellulose acetate membranes have also been studied to improve biological compatibility and water permeability of the cellulose acetate membranes. For example, cellulose compound membranes to which cellulose acetate propionate was applied are disclosed in JP-A 57-133211, JP-A 60-43442, JP-A 60-5202, JP-A 62-290468, JP-A 1-20245, JP-A 2-12611, JP-A 2-211228, JP-A 6-277473 and JP-A 6-31144.

However, none of these prior art specifically describe a hollow fiber membrane exhibiting both a high water permeation rate and high strength. Further, the membranes disclosed in these prior art are dialysis membranes or pervaporization membranes which are also membranes with a small pore diameter or non-porous membranes, and these are different from membranes with high fractionation performance used for water treatment.

Cellulose acetate hollow fiber membranes used for the purpose of water treatment are disclosed in e.g. JP-A 6-343842 and JP-A 8-108053, but it is problematic that when these cellulose acetate hollow fiber membranes are used in purification of natural water such as river water, underground water, lake water, marsh water and seawater, the membranes are degraded by microorganisms in the raw water. Accordingly, in purification of natural water by the cellulose acetate hollow fiber membrane, sterilization with sodium hypochlorite is carried out constantly or intermittently to prevent the microbial degradation of the membrane. However, when sodium hypochlorite binds to humus in natural water, there arises the problem of generation of sterilization byproducts such as carcinogenic trihalomethane.

DISCLOSURE OF THE INVENTION

The present invention can solve the problem that the cellulose acetate membrane is liable to microbial degradation as described above. The present invention is applicabale to purification of natural water. The invention can be conducted without sterilization treatment by an aqueous solution of sodium hypochlorite etc., with reduced frequency of the treatment. It is not involved in microbial degradation. The present invention provides a cellulose compound hollow fiber membrane with a high water permeation rate and an excellent mechanical strength.

The present invention provides a hollow fiber membrane comprising a cellulose compound as a membrane material, wherein the thickness of the membrane is 50 to 500 $\mu$m, a dense membrane surface having an average pore diameter of 0.001 to 0.05 $\mu$m exists on the internal and/or external surface thereof, the inside of the membrane is composed of a three-dimensional network-like porous structure having voids with an average pore diameter of 0.05 to 2 $\mu$m, and 70% by weight or more of the membrane material is cellulose acetate propionate or cellulose acetate butyrate.

The hollow fiber of the present invention is used as permeation membranes for purification of water, natural water etc., and treatment of waste water. The present invention provides a method for purifying water by use of the above-mentioned hollow fiber as a permeation membrane and use of the above-mentioned hollow fiber for a permeation membrane. Permeation may be preferably conducted at the pure water permeation rate of 200 1/(m$^2$.h) or more at a transmembrane pressure of 100 kPa and at a temperature of 25° C.

The invention provides permeation of water or filtration of matters to be removed out by use of the above-mentioned hollow fiber membrane. It may be used for permeation, osmosis or reverse osmosis.

DETAILED DESCRIPTION OF THE INVENTION

The cellulose compound hollow fiber membrane of the present invention (referred to hereinafter as "hollow fiber membrane") has a membrane thickness of 50 to 500 $\mu$m, preferably 100 to 400 $\mu$m, in order to confer a good balance of mechanical strength and water permeability thereon.

The internal and/or external surface of the hollow fiber membrane of the present invention has a dense membrane surface having an average pore diameter of 0.001 to 0.05 $\mu$m, preferably 0.005 to 0.03 $\mu$m. The above-mentioned range of the average pore diameter corresponds, in terms of molecular weight cut-off, to 10,000 to 500,000, preferably 70,000 to 300,000. The internal and/or external surface of the hollow fiber membrane of the present invention is a dense membrane surface as described above, and the one wherein both the internal and external surfaces are dense membrane surfaces is particularly preferable.

The inside of the hollow fiber membrane of the present invention is composed of a three-dimensional network-like porous structure having voids with an average pore diameter of 0.05 to 2 $\mu$m, preferably 0.1 to 1 $\mu$m. This "three-dimensional network-like porous structure" provides the hollow fiber membrane with a good mechanical strength and a good extensibility. It has voids having a larger average pore diameter than the dense surface layer. It is preferable that the inner structure does not contain plural gigantic voids having a pore diameter of 10 $\mu$m or more, but it is more preferably free of such gigantic voids having a pore diameter of 10 $\mu$m or more.

The average pore diameter of the inside of the membrane can be determined by taking electron microphotographs (at a magnification ×10,000) of 10 sections of the membrane at equal intervals from the internal surface to the external surface of the membrane, calculating the average diameter of pores being present in 5 $\mu$m$^2$ of each section of the microphotographs and further calculating the average of the 10 average diameters. In the relationship between distances in the thickness direction of the membrane and the average pore diameter of each section, that is, in the distribution of pore diameters in the three-dimensional network-like porous structure in the inside of the membrane, there is at least one maximum value, and the maximum value (maximum pore diameter) is 0.5 to 5 $\mu$m, preferably 1 to 4 $\mu$m.

The hollow fiber membrane of the present invention comprises a cellulose compound as a membrane material, and 70% or more, preferably 80% by weight or more of the membrane material is cellulose acetate propionate or cellulose acetate butyrate, and more preferably 100% by weight of the membrane material is cellulose acetate propionate or cellulose acetate butyrate. When the content of cellulose acetate propionate or cellulose acetate butyrate is 70% by weight or more, the resulting membrane is hardly degraded by microorganisms and is excellent in compatibility even if mixed with other cellulose compounds, and a reduction in the mechanical strength of the membrane can thus be prevented.

The degree of substitution of acetyl and propionyl in cellulose acetate propionate and the degree of substitution of acetyl and butyryl in cellulose acetate butyrate, though being not particularly limited, are preferably 1.5 to 2.9, more preferably 2.0 to 2.8. Further, the ratio of acetyl to propionyl or of acetyl to butyryl is not particularly limited. Further, the number average molecular weight of cellulose acetate propionate and cellulose acetate butyrate is preferably 10,000 to 500,000, more preferably 50,000 to 200,000, to improve spinning properties.

When a mixture consisting of cellulose acetate propionate or cellulose acetate butyrate and other cellulose compounds is used as a material of the hollow fiber membrane of the present invention, the other cellulose compounds may be cellulose ester compounds such as cellulose diacetate, cellulose triacetate and cellulose butyrate, and cellulose ether compounds such as methyl cellulose and ethyl cellulose, and further, polysulfone polymers, polyacrylonitrile polymers, polyamide polymers, polyvinyl pyrrolidone, polyvinyl formal etc. can be also used in combination therewith.

In the hollow fiber membrane of the present invention, the tensile strength at break is preferably 3 MPa or more, more preferably 4 MPa or more, and the tensile elongation at break is preferably 15% or more, more preferably 20% or more, to maintain durability for a prolonged period of time.

In the hollow fiber membrane of the present invention, the rate of pure water permeation rate at a transmembrane pressure of 100 kPa at a temperature of 25° C. is preferably 200 L/(m².h) or more, more preferably 300 L/(m².h) or more. Herein, "pure water" refers to water obtained by filtering deionized water having an electrical resistance of 0.2 μS/cm or less through a membrane having a molecular weight cut-off of 30,000.

The cellulose derivative hollow fiber membrane according to the present invention can be produced by e.g. phase conversion methods in wet or dry wet processes.

A spinning stock solution used in these methods is obtained by dissolving 70% by weight or more of cellulose compounds including cellulose acetate propionate or cellulose acetate butyrate as the membrane material in a solvent as described above.

This solvent may be any solvent which can be mixed with water and includes acetone, dioxane, acetic acid, dimethyl sulfoxide, dimethylacetamide, N-methyl-2-pyrrolidone, dimethylformamide etc. Among these, high-boiling solvents capable of spinning at 100° C. or more, for example dimethyl sulfoxide, dimethylacetamide and N-methyl-2-pyrrolidone are preferable to increase the water permeation rate, and dimethyl sulfoxide is preferable for forming the prescribed three-dimensional network-like porous structure to improve mechanical strength.

In addition to these solvents, it is further possible to add non-solvents such as ethylene glycol and polyethylene glycol and metal compounds such as lithium chloride, calcium chloride, magnesium chloride, lithium nitrate, barium nitrate, magnesium nitrate, lithium acetate and magnesium acetate.

The concentration of cellulose compounds in the spinning stock solution is preferably 15 to 35% by weight, more preferably 20 to 30% by weight.

An inside coagulating solution or a coagulation water bath used in production include non-solvents for cellulose compounds, that is, water, ethylene glycol, polyethylene glycol or a mixture of these non-solvents and the organic solvents described above. Among these, the inside coagulating solution is preferably water or a combination of water and polyethylene glycol, and the coagulation water bath is preferably water or a combination of water and the organic solvent used in the spinning stock solution.

The temperature of the inside coagulating solution and the coagulation water bath is preferably 30 to 90° C. At a temperature of 30° C. or more, the thickness of the dense layer as the surface of the membrane can be suitably adjusted to attain a high water permeation rate, while at a temperature of 90° C. or less, the boiling of the inside coagulating liquid or the coagulation water bath does not occur thus facilitating the manufacturing procedure.

The temperature of the orifice of the nozzle for discharging the spinning stock solution is preferably 30 to 130° C., more preferable 50 to 100° C. In the case of spinning in a dry wet process, the distance between the discharge orifice of the nozzle and the surface of the coagulation water bath is set in the range of preferably 1 to 50 cm, more preferably 5 to 30 cm, such that the hollow fiber membrane after being discharged can remain in the air for 0.2 second or more.

The hollow fiber membrane of the present invention is suitable particularly for purification of natural water such as river water, underground water, lake water, marsh water and seawater, and can further be applied to treatment of various kinds of waste water from factories, homes etc.

As described above, the cellulose compound hollow fiber membrane according to the present invention has high mechanical strength and is hardly degraded by microorganisms so that even if washing with a germicide such as sodium hypochlorite is not conducted at all or the frequency of such treatment is considerably reduced, its high water permeability can be maintained.

EXAMPLES

Hereinafter, the present invention is described more in detail by reference to Examples, which however are not intended to limit the present invention. Each measurement given below was conducted in the following method.

(1) Pure Water Permeation Rate

The inside of a hollow fiber membrane having an effective length of 50 cm was pressurized with pure water at 25° C. at a water pressure of 100 kPa to determine the amount of pure water permeated per unit time, and the water permeation rate was divided by the membrane area of internal surface area standard.

(2) Tensile Strength and Elongation at Break

A test piece of the hollow fiber membrane with an effective length of 5 cm was stretched at a cross-head rate of 10 mm/min by use of tension to measure tensile strength and elongation at break. The strength was determined by dividing the measured strength by the cross-section of the hollow fiber membrane.

(3) Molecular Weight Cut-off

Various kinds of proteins having different molecular weights were used as standard solutes and examined for their respective exclusion rate from the membrane, and the relationship between their molecular weights and their corresponding exclusion rates was plotted on a graph, and from the resulting curve of molecular weight vs. exclusion rate, the molecular weight corresponding to 90% exclusion rate was determined.

(4) Microbial Degradability

The hollow fiber membrane was immersed in the Ibo river stream, then sampled with time and examined for its tensile strength at break, and the number of days having passed until the strength was reduced to 90% of the initial strength was determined.

Example 1

Figure 1:
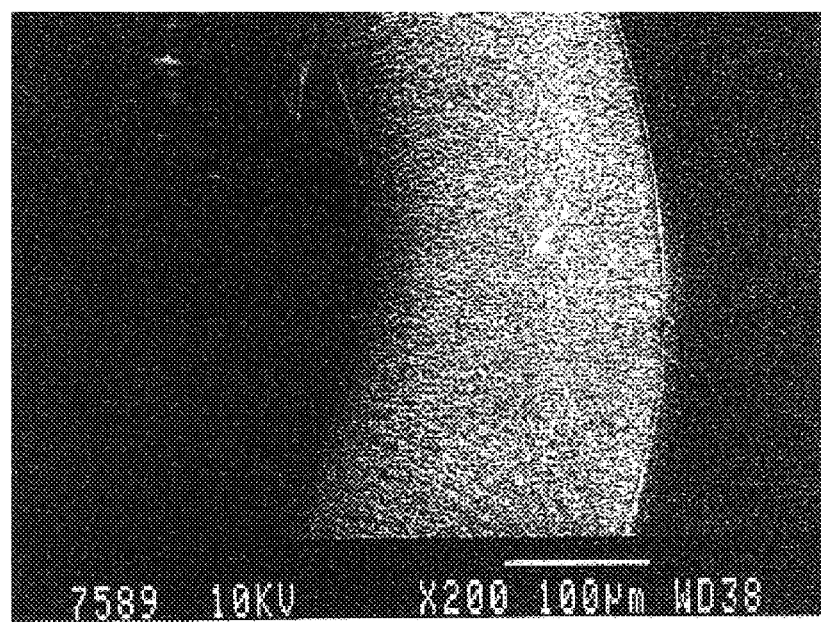
FIG. 1 is an electron microphotograph at a magnification of ×200 of a cross-section of the hollow fiber membrane obtained in Example 1.
Figure 2:
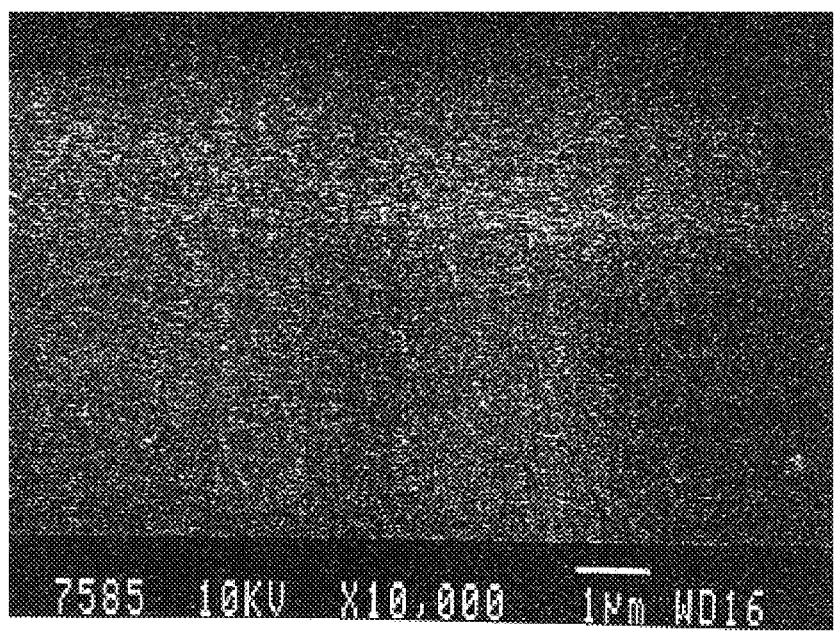
FIG. 2 is an electron microphotograph at a magnification of ×10,000 of the internal surface of the hollow fiber membrane obtained in Example 1.

A spinning stock solution consisting of 24% by weight of cellulose acetate propionate (degree of substitution: 2.68; number average molecular weight: 75,000; acetyl: 2.5%; and propionyl: 61.2%) and 76% by weight of dimethyl sulfoxide was discharged from an outer pipe of a double pipe type nozzle while water was discharged from an inner pipe of the nozzle as an inside coagulating solution. The temperature of the spinning stock solution at the discharge opening was 70° C. After passing the discharged spinning stock solution through the air for 1 second, it was coagulated in a coagulation water bath (hot water at 70° C.), and then the solvent was completely removed in a washing bath (hot water at 50° C.) to give a hollow fiber membrane. An electron microphotograph (at a magnification of ×200) of the inside (cross-section) of the hollow fiber membrane is shown in FIG. 1, and an electron microphotograph (at a magnification of ×10,000) of the internal surface thereof in FIG. 2. As is also evident from FIGS. 1 and 2, the hollow fiber membrane had a three-dimensional network-like porous structure with a dense structure in the internal and external surfaces thereof. Each value in the structure of the hollow fiber membrane and the test results are shown in Table 1.

Example 2

A hollow fiber membrane was obtained in the same manner as in Example 1 except that a spinning stock solution consisting of 24% by weight of cellulose acetate propionate (degree of substitution: 2.68; number average molecular weight: 75,000; acetyl: 2.5%; and propionyl: 61.2%), 75% by weight of dimethyl sulfoxide and 1% by weight of polyethylene glycol (manufactured by Sanyo Chemical Industries, Ltd., PEG200) was used. A cross-section of this hollow fiber membrane had a three-dimensional network-like porous structure with a dense structure in the internal and external surfaces thereof. Each value in the structure of the hollow fiber membrane and the test results are shown in Table 1.

Example 3

A hollow fiber membrane was obtained in the same manner as in Example 1 except that a spinning stock solution consisting of 22% by weight of cellulose acetate propionate (degree of substitution: 2.68; number average molecular weight: 75,000; acetyl: 2.5%; and propionyl: 61.2%), 77% by weight of dimethyl sulfoxide and 1% by weight of lithium chloride (manufactured by Wako Pure Chemical Industries, Ltd.) was used. A cross-section of the hollow fiber membrane had a three-dimensional network-like porous structure with a dense structure in the internal and external surfaces thereof. Each value in the structure of the hollow fiber membrane and the test results are shown in Table 1.

Example 4

A hollow fiber membrane was obtained in the same manner as in Example 1 except that a spinning stock solution consisting of 23% by weight of cellulose acetate propionate (degree of substitution: 2.68; number average molecular weight: 75,000; acetyl: 2.5%; and propionyl: 61.2%), 75% by weight of dimethyl sulfoxide and 2% by weight of triacetate cellulose (manufactured by Daicel Chemical Industries, Ltd., acetylation degree: 60.8%; and degree of polymerization: 150) was used. A cross-section of the hollow fiber membrane had a three-dimensional network-like porous structure with a dense structure in the internal and external surfaces thereof. Each value in the structure of the hollow fiber membrane and the test results are shown in Table 1.

Example 5

Figure 3:
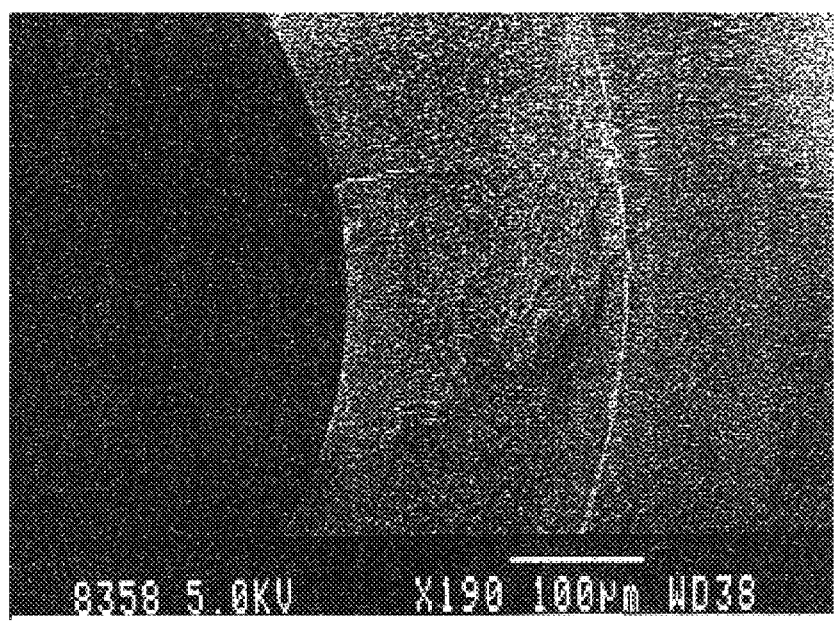
FIG. 3 is an electron microphotograph at a magnification of ×190 of a cross-section of the follow fiber membrane obtained in Example 1.

A hollow fiber membrane was obtained in the same manner as in Example 1 except that a spinning stock solution consisting of 24% by weight of cellulose acetate butyrate (degree of substitution: 2.69; number average molecular weight: 70,000; acetyl content: 13.5%; and butyryl content: 37.0%) and 76% by weight of dimethyl sulfoxide was used. An electron microphotograph (at a magnification of ×190) of the inside (cross-section) of the hollow fiber membrane is shown in FIG. 3. As is also evident from FIG. 3, the cross-section of the hollow fiber membrane had a three-dimensional network-like porous structure with a dense structure in the internal and external surfaces thereof. Each value in the structure of the hollow fiber membrane and the test results are shown in Table 1.

Comparative Example 1

A hollow fiber membrane was obtained in the same manner as in Example 1 except that a spinning stock solution consisting of 20% by weight of cellulose triacetate (manufactured by Daicel Chemical Industries, Co., Ltd., acetylation degree: 60.8%; and degree of polymerization: 150) and 80% by weight of dimethyl sulfoxide was used. Plural gigantic voids having a void diameter of about 150 μm occurred in the three-dimensional network-like porous structure on a cross-section of the hollow fiber membrane. Each value in the structure of the hollow fiber membrane and the test results are shown in Table 1.

Comparative Example 2

A hollow fiber membrane was obtained in the same manner as in Example 1 except that a spinning stock solution consisting of 24% by weight of cellulose acetate propionate (degree of substitution: 2.68; number average molecular weight: 75,000; acetyl: 2.5%; and propionyl: 61.2%) and 76% by weight of N-methyl-2-pyrrolidone was used. Plural gigantic voids having a void diameter of about 50 μm occurred in the three-dimensional network-like porous structure on a cross-section of the hollow fiber membrane. Each value in the structure of the hollow fiber membrane and the test results are shown in Table 1.

Comparative Example 3

A hollow fiber membrane was obtained in the same manner as in Example 1 except that a spinning stock solution consisting of 20% by weight of cellulose acetate propionate (degree of substitution: 2.68; number average molecular weight: 75,000; acetyl: 2.5%; and propionyl: 61.2%), 73% by weight of dimethyl sulfoxide and 7% by weight of polyethylene glycol (manufactured by Sanyo Chemical Industries, Ltd., PEG200) was used. Plural gigantic voids having a void diameter of about 100 μm occurred in the three-dimensional network-like porous structure on a cross-section of the hollow fiber membrane. Each value in the structure of the hollow fiber membrane and the test results are shown in Table 1.

Comparative Example 4

A hollow fiber membrane was obtained in the same manner as in Example 1 except that a spinning stock solution consisting of 15% by weight of cellulose acetate propionate (degree of substitution: 2.68; number average molecular weight: 75,000; acetyl: 2.5%; and propionyl: 61.2%), 10% by weight of cellulose triacetate (manufactured by Daicel Chemical Industries, Co., Ltd., acetylation degree: 60.8%; and degree of polymerization: 150) and 75% by weight of dimethyl sulfoxide was used. Plural gigantic voids having a void diameter of about 50 μm occurred in the three-dimensional network-like porous structure on a cross-section of the hollow fiber membrane. Each value in the structure of the hollow fiber membrane and the test results are shown in Table 1. The strength of the hollow fiber membrane was too low to conduct the microbial degradability test.

Comparative Example 5

A hollow fiber membrane was obtained in the same manner as in Example 1 except that a spinning stock solution consisting of 24% by weight of cellulose acetate butyrate (degree of substitution: 2.69; number average molecular weight: 70,000; acetatyl content: 13.5%; and butyryl content: 37.0%) and 76% by weight of N-methyl-2-pyrrolidone was used. Plural gigantic voids having a void diameter of about 50 μm occurred in the three-dimensional network-like porous structure on a cross-section of the hollow fiber membrane. Each value in the structure of the hollow fiber membrane and the test results are shown in Table 1. The strength of the hollow fiber membrane was too low to conduct the microbial degradability test.

TABLE 1

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| Thickness of the membrane (μm) | 250 | 250 | 250 | 250 | 250 | 250 | 250 | 250 | 250 | 250 |
| Internal diameter of the membrane (mm) | 0.8 | 0.8 | 0.8 | 0.8 | 0.8 | 0.8 | 0.8 | 0.8 | 0.8 | 0.8 |
| Outer diameter of the membrane (mm) | 1.3 | 1.3 | 1.3 | 1.3 | 1.3 | 1.3 | 1.3 | 1.3 | 1.3 | 1.3 |
| An average pore diameter of the internal surface of the membrane (μm) | <0.05 | <0.05 | <0.05 | <0.05 | <0.05 | <0.05 | <0.05 | <0.05 | <0.05 | <0.05 |
| An average pore diameter of the inside of the membrane (μm) | 0.5 | 0.3 | 0.7 | 0.9 | 0.8 | — | — | — | — | — |
| The maximum pore diameter of the inside of the membrane (μm) | 1.8 | 1.2 | 2.9 | 2.0 | 1.7 | having voids | having voids | having voids | having voids | having voids |
| Content of cellulose acetate propionate (wt %) | 100 | 100 | 100 | 92 | — | — | 100 | 100 | 60 | — |
| Content of cellulose acetate butyrate (wt %) | — | — | — | — | 100 | — | — | — | — | 100 |
| Content of the other cellulose (wt %) | — | — | — | 8 | — | 100 | — | — | 40 | — |
| Pure water permeation rate (L/m² · h) | 650 | 550 | 720 | 630 | 360 | 500 | 570 | 610 | 570 | 260 |
| Tensile strength at break (kPa) | 5.5 | 4.7 | 5.3 | 5.0 | 6.0 | 5.2 | 2.2 | 2.8 | 1.3 | 1.6 |
| Tensile elongation at break (%) | 22 | 20 | 24 | 25 | 20 | 30 | 13 | 14 | 5 | 9 |
| Molecular weight cut-off | 100000 | 150000 | 100000 | 150000 | 100000 | 150000 | 100000 | 100000 | 100000 | 100000 |
| Number of days until microbial degradation (days) | 200 or more | 200 or more | 200 or more | 200 or more | 200 or more | 50 | 200 or more | 200 or more | — | — |

What is claimed is:

1. A hollow fiber membrane comprising a cellulose compound as a membrane material, wherein the thickness of the membrane is 50 to 500 μm, a dense membrane surface having an average pore diameter of 0.001 to 0.05 μm exists on the internal and/or external surface thereof, the inside of the membrane is composed of a three-dimensional network porous structure having voids with an average pore diameter of 0.1 to 2 μm and a maximum value in the distribution of pore diameters of 0.5 to 5 μm, a tensile strength at break of the hollow fiber membrane is at least 3 MPa, a pure water permeation rate is 200 l/(m²h) or more at a transmembrane pressure of 100 kPa and at a temperature of 25° C., an elongation at break of the membrane is at least 15% and 70% by weight or more of the membrane material is cellulose acetate propionate or cellulose acetate butyrate.

2. The cellulose compound hollow fiber membrane as claimed in claim 1, wherein a tensile strength at break of the hollow fiber membrane is at least 4 MPa, and an elongation at break thereof is at least 20%.

3. The cellulose compound hollow fiber membrane as claimed in claim 1, which is used for treatment of natural water.

4. The cellulose compound hollow fiber membrane as claimed in claim 1, wherein the voids have an average pore diameter of 0.1 to 1 μm.

5. A method of purifying water comprising a step of passing the water through the hollow fiber membrane of claim 1.

6. A permeation membrane comprising the hollow fiber membrane of claim 1.

* * * * *